United States Patent [19]

Lanting et al.

[11] Patent Number: 5,357,822
[45] Date of Patent: Oct. 25, 1994

[54] TRANSMISSION SHIFTING MECHANISM AND FORCE ATTENUATOR THEREFOR

[75] Inventors: Mark L. Lanting, Portage; Stanley W. Crull, Kalamazoo; Stephen A. Edelen, Battle Creek, all of Mich.

[73] Assignee: Eaton Corporation, Cleveland, Ohio

[21] Appl. No.: 46,695

[22] Filed: Apr. 13, 1993

[51] Int. Cl.⁵ .................... F16H 59/04; F16H 61/32; F16H 61/34
[52] U.S. Cl. .................... 74/473 R; 74/335; 192/109 A
[58] Field of Search ............ 74/335, 473 R; 192/109 A

[56] References Cited

U.S. PATENT DOCUMENTS

| | | | |
|---|---|---|---|
| 2,200,013 | 5/1940 | Sanford | 74/335 X |
| 3,921,469 | 11/1975 | Richards | 74/339 |
| 4,425,814 | 1/1984 | Dick | 192/109 A X |
| 4,428,248 | 1/1984 | Broucksou et al. | 74/335 |
| 4,449,416 | 5/1984 | Huitema | 192/109 A |
| 4,873,881 | 10/1989 | Edelen et al. | 74/335 X |
| 4,938,088 | 7/1990 | Langley et al. | 192/109 A X |

FOREIGN PATENT DOCUMENTS 301724 2/1989 European Pat. Off. .

Primary Examiner—Allan D. Herrmann
Attorney, Agent, or Firm—L. J. Kasper

[57] ABSTRACT

An X-Y shifting mechanism (25) is disclosed for controlling the shifting of a shift rail (17) in a first (Y-Y) transverse direction. The mechanism includes a shift finger assembly (39) including a shift finger (23). A lever member (57) is pivotable about the axis (A) of rotation. When the lever member (57) is pivoted, the movement is transmitted through a spring (91) to rotate a spring seat member (73), thus causing pivotal movement of the shift finger (23). During a non-synchronous engagement, kick-out movement causes pivotal movement of the shift finger in the opposite direction, compressing the spring (91) rather than damaging the shifting mechanism. The disclosed mechanism also enables preselection of neutral, compressing the appropriate one of the springs (91), such that the preloaded spring will move the shift finger and shift rail to the neutral position as soon as a torque break occurs.

8 Claims, 4 Drawing Sheets

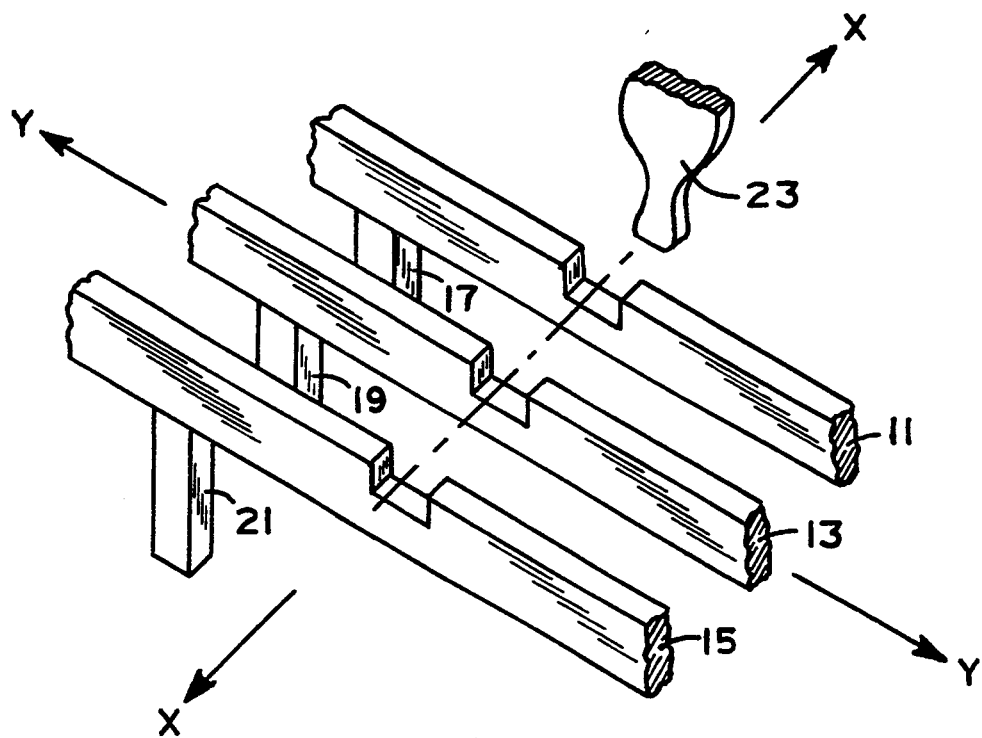
FIG. 2
FIG. 6
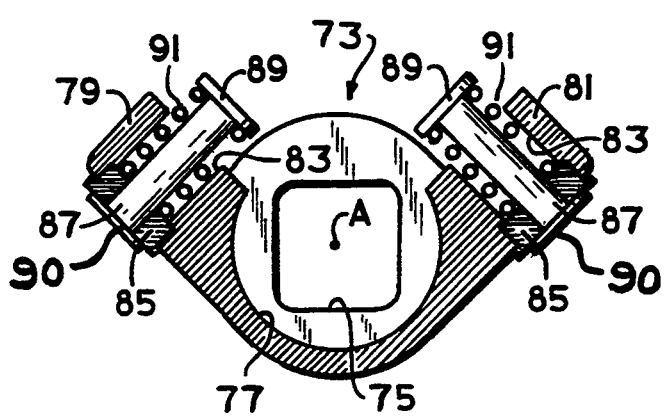
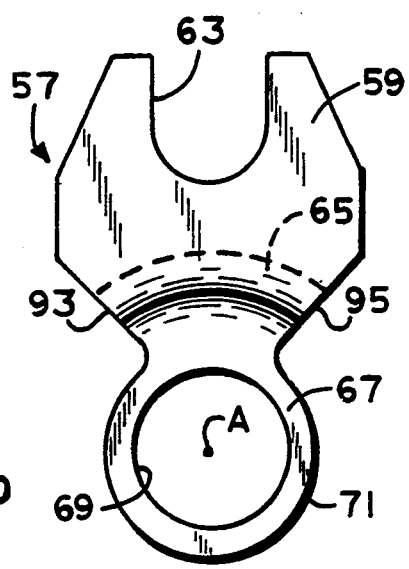
FIG. 5

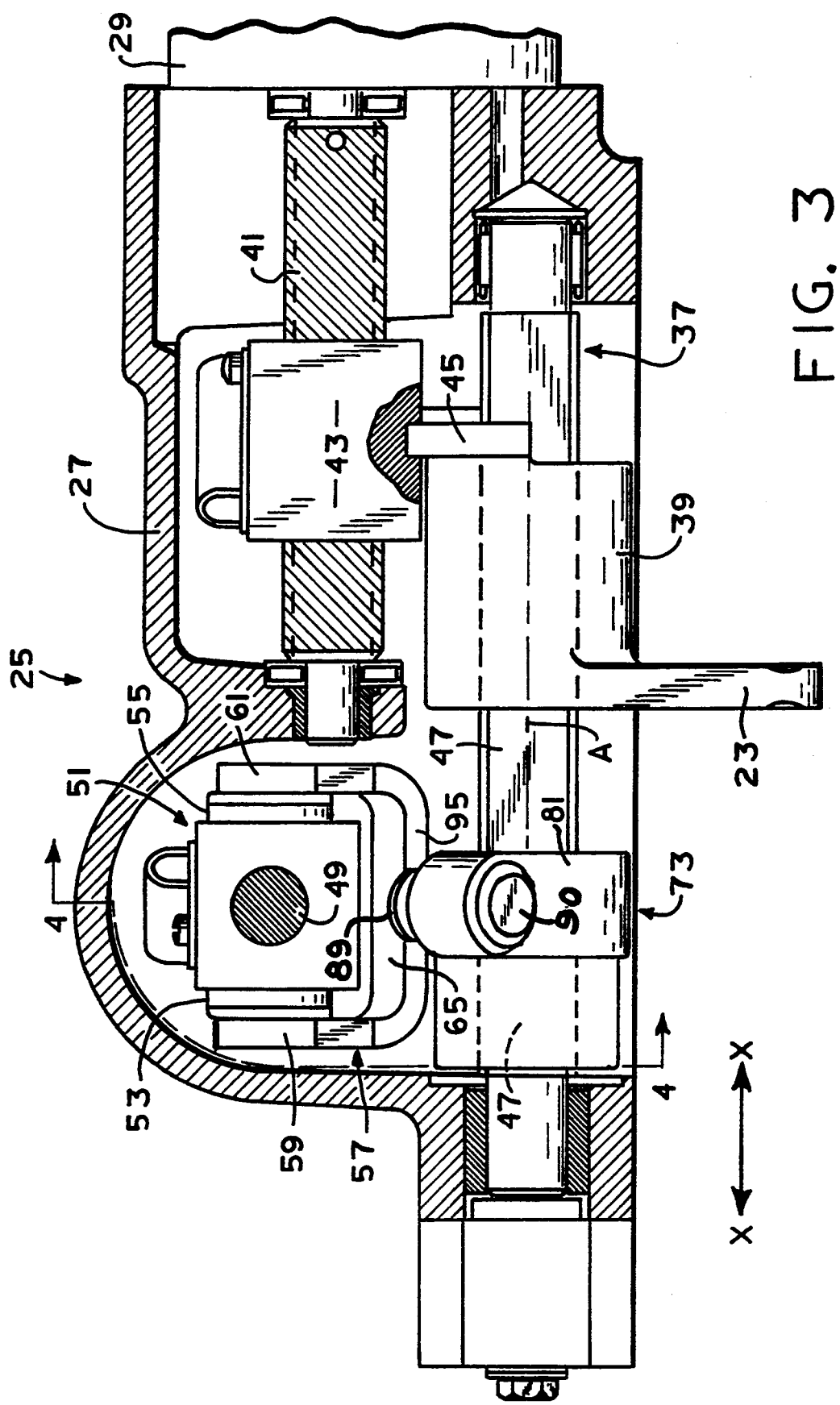

TRANSMISSION SHIFTING MECHANISM AND FORCE ATTENUATOR THEREFOR

BACKGROUND OF THE INVENTION

The present invention relates to a shifting mechanism of the "X-Y" type for use with a shift bar housing assembly of a mechanical change-gear transmission, and more particularly, to such a mechanism of the type which is automatically or semi-automatically shifted, on a transmission which otherwise would be manually shifted.

Shift bar housing assemblies for mechanical change-gear transmissions usually comprise a plurality of generally parallel, independently transversely movable shift bars, which are to be selected, and moved transversely, to effect engagement/disengagement of a particular gear ratio. Such shift-bar housing assemblies are well known to those skilled in the art, as may be seen by reference U.S. Pat. Nos. 2,951,392; 4,567,785; and 4,873,881, all of which are assigned to the assignee of the present invention and incorporated herein by reference.

Typically, such shift bar housings have been manually controlled, and operated by a shift finger fixed to a directly mounted shift lever, or to the cross-shaft of a remotely controlled shifting mechanism. Automatic and semi-automatic mechanical transmissions, based upon generally standard mechanical transmissions, but provided with electric or pneumatic actuators, are now well known in the prior art, as may be seen by reference to U.S. Pat. Nos. 4,361,060 and 4,648,290, the latter of which is assigned to the assignee of the present invention, and both are incorporated herein by reference.

Also now well known in the prior art are automatically controlled "X-Y" type shifting mechanisms, wherein a shift finger is automatically moved in the axial (X-X) or rail selection direction, and then in the transverse (Y-Y) or gear engagement/disengagement direction. It will be understood by those skilled in the art that reference herein to the "transverse" and "axial" directions pertains to the shifter, and do not necessarily imply any particular direction on either the transmission or the vehicle. Also known are single shaft shifting mechanisms, as may be seen by reference to U.S. Pat. No. 4,920,815, which is assigned to the assignee of the present invention, and the disclosure of which is incorporated herein by reference.

Frequently, such an automatic or semi-automatic X-Y shifting mechanism is applied to a non-synchronous mechanical change-gear transmission. As used herein, the term "non-synchronous" will be understood to refer to a mechanical change-gear transmission of the type not equipped with synchronizers (or with less than extremely accurate synchronizers). On such a transmission, one of the problems associated with using an automatic or semi-automatic shifting mechanism is the occurrence of non-synchronous clutch engagements, i.e., an engagement wherein the mating jaw clutches come into contact with each other (typically, on the transverse, end surfaces of the jaws), but don't actually engage in the manner intended for such clutches.

Typically, one result of a non-synchronous clutch engagement is a phenomenon known as "kick-out", in which the jaw clutch being moved into engagement with another jaw clutch is only partially engaged, and then is effectively kicked out of engagement. Such kick-out movement is normally transmitted from the jaw clutch, back through the shift fork, the shift finger, and the shifting mechanism. This kick-out force being transmitted back through the shifting mechanism can cause damage to any one of a number of components of the shift system. By way of example only, in electrically actuated shifting mechanisms of the type illustrated in above-incorporated U.S. Pat. No. 4,873,881, a rotary input from an electric motor provides an input to the shifting mechanism by means of a recirculating ball-screw device. When such a shifting mechanism is subjected to a kick-out force, even if most of the system components can withstand the force without breaking, one typical result is damage to the threads in the ball-screw mechanism. As will be understood by those skilled in the art, thread damage in such a mechanism can render the mechanism nearly inoperable.

SUMMARY OF THE INVENTION

Accordingly, it is an object of the present invention to provide an improved shifting mechanism of the type described above, which is capable of absorbing the "kick-out" forces of a jaw clutch, thus avoiding damage to any of the components of the shifting mechanism.

It is a related object of the present invention to provide such a shifting mechanism, which accomplishes the above-stated object, wherein, after absorbing the kick-out forces, the mechanism is then operable to resiliently re-engage the jaw clutch as soon as it is in a synchronous condition.

The above and other objects of the invention are accomplished by the provision of an improved shifting mechanism for controlling the shifting of change-gears of a mechanical change-gear transmission of the type having at least one shift rail movable in a first (Y-Y) transverse direction from a gear-disengaged position to a gear-engaged position. The shifting mechanism comprises a housing, and shaft means disposed within the housing and supported therein for axial movement in a first axial direction, the shaft means defining an axis of rotation. A shift finger assembly includes a shift finger and is operatively associated with the shaft means, and pivotable about the axis of rotation, to move the shift finger in the first transverse direction. The shifting mechanism further comprises input means including a lever member pivotable about the axis of rotation to cause the pivotal movement of the shaft means and the shift finger.

The improved shifting mechanism is characterized by one of the shift finger assembly and the lever member defining a spring seat. Spring means includes a first end seated against the spring seat, and a second end operably associated with the other of the shift finger assembly and the lever member. As a result, pivotal movement of the lever member in a first rotational direction about the axis of rotation is transmitted through the spring means to resiliently bias the shift finger assembly toward an engaged position, moving the shift finger in the first transverse direction.

In accordance with a more limited aspect of the present invention, axial movement of the shift rail in the first transverse direction is adapted to cause at least partial engagement of a jaw clutch. Any kick-out movement of the jaw clutch results in pivotal movement of the shift finger in a second transverse direction, opposite the first transverse direction, such movement tending to compress the spring means, in preparation for subsequent re-engagement of the jaw clutch.

BRIEF DESCRIPTION OF THE DRAWINGS

FIG. 2 is a perspective view of shift rails commonly used in a mechanical change-gear transmission of the type to which the present invention relates.

FIG. 3 is an axial cross-section, taken on line 3—3 of FIG. 1 (in the plane of the X-X direction), on a somewhat larger scale than FIG. 1.

FIG. 5 is a plan view, similar to FIG. 4, of the lever member of the present invention.

FIG. 6 is a transverse cross-section, generally similar to FIG. 4, illustrating the spring seat of the present invention.

DESCRIPTION OF THE PREFERRED EMBODIMENT

In this disclosure, certain terminology will be used for convenience, in reference only, and will not be limiting. For example, the terms "pivot" and "rotate" as used herein will both refer to movement about an axis, and will include normal derivatives of the above-mentioned terms. Similarly, the term "axial" is used hereinafter in conjunction with movement in X-X direction, whereas the term "transverse" is used in conjunction with movement in the Y-Y direction. It will be understood that neither term is intended to be limiting, but such terms are used only for ease of explanation.

Mechanical change-gear transmissions are well known in the art, as may be seen by reference to U.S. Pat. No. 3,105,395, assigned to the assignee of the present invention and incorporated herein by reference. Remote controls for shifting transmissions of this type are well known in the art, as may be seen by reference to U.S. Pat. No. 4,104,928 which is assigned to the assignee of the present invention and incorporated herein by reference.

Such transmissions typically include a shift bar housing assembly of the type which is now well known to those skilled in the art, and is illustrated and described in greater detail in U.S. Pat. No. 4,455,883, assigned to the assignee of the present invention and incorporated herein by reference. As may be seen by reference to FIG. 2, such a shift bar housing assembly typically comprises a plurality of substantially parallel, spaced-apart, transversely movable shift rails 11, 13, and 15, which carry shift forks 17, 19, and 21, respectively, the shift forks being shown only fragmentarily in FIG. 2. Each of the shift forks is associated with a positive clutch mechanism, such as a jaw clutch, for selectively engaging/disengaging one or the other of a pair of gears to a shaft.

Typically, shifting of such transmissions is accomplished by selecting one of the shift rails 11, 13, or 15, by moving a shift finger 23 in the axial (X-X) direction, into alignment with a notch defined by the selected shift rail. Shifting is completed by then causing transverse movement of the selected shift rail, typically by pivoting the shift finger to apply a transverse force thereto in the Y-Y direction. Alternatively, and also within the scope of the present invention, shifting could be accomplished by means of the single shaft arrangement of the type shown in above-incorporated U.S. Pat. No. 4,920,815. It should be understood by those skilled in the art that the present invention is not limited to any particular shift rail configuration, and that FIG. 2 is included primarily to facilitate an understanding of the shifting mechanism to be described subsequently.

Figure 1:
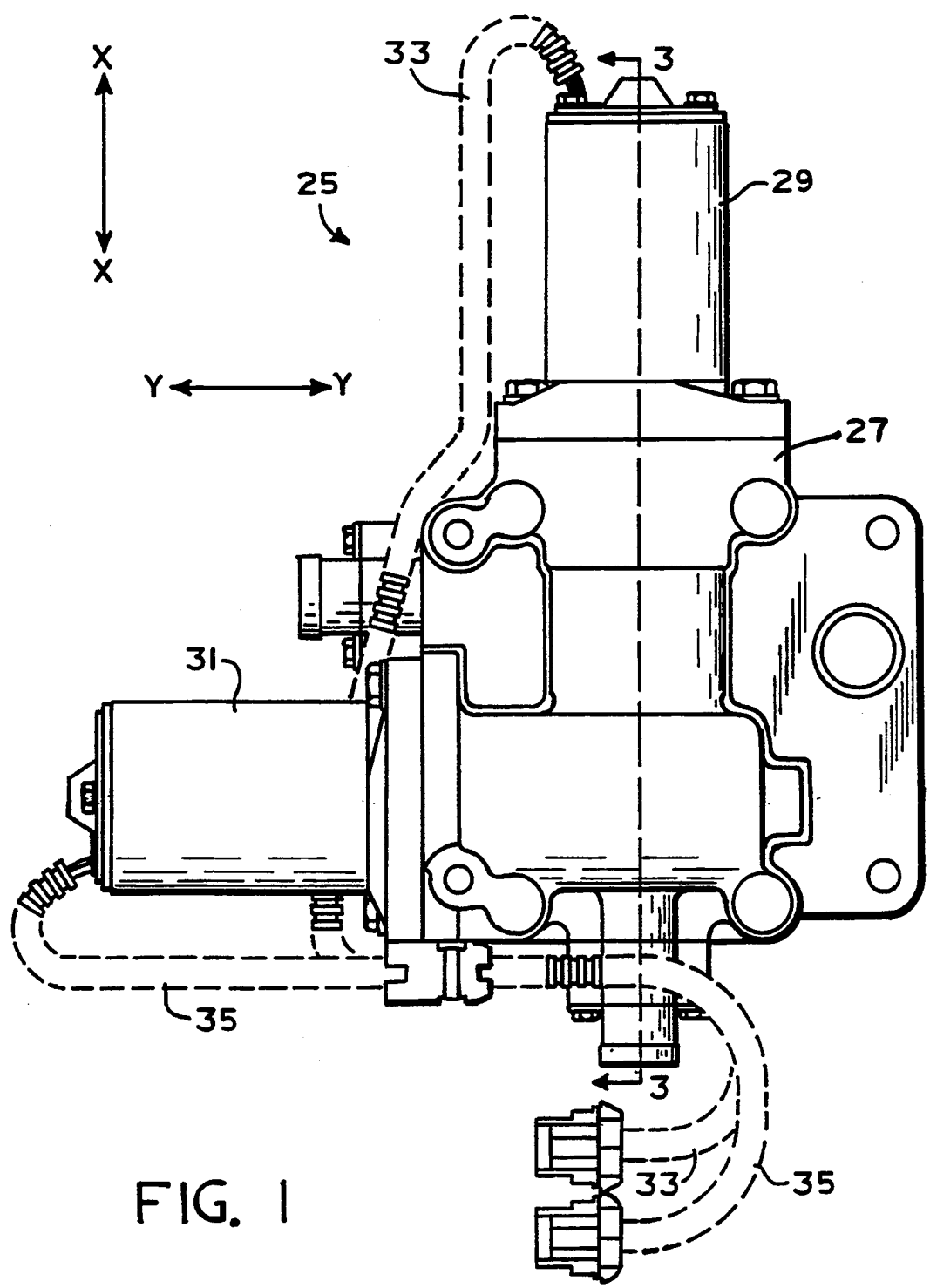
FIG. 1 is a top plan view of an X-Y shifting mechanism of the type to which the present invention relates.

Referring now primarily to FIG. 1, the shifting mechanism of the present invention, generally designated 25, includes a housing 27 that is mountable upon a mechanical change-gear transmission and shift bar housing (neither of which is shown herein). The mechanism 25 includes an electric motor 29, mounted to the housing 27, which is operable to move the shift finger 23 in the axial (X-X) direction. The mechanism 25 also has an electric motor 31, also mounted to the housing 27, which is operable to move the shift finger 23 in the transverse (Y-Y) direction. The movement of the shift finger 23 in both the X-X and the Y-Y directions will be described in greater detail subsequently, in conjunction with FIGS. 3 through 6.

Electric motors 29 and 31 are powered by a suitable power source, carried by the vehicle, such as the vehicle battery (not shown herein). The shifting mechanism 25 is controlled by suitable electrical circuitry (also not shown herein) which is now well known to those skilled in the art. The circuitry is operable to receive and process a gear shift selection signal, and to receive and process a speed signal, then energize the electric motor 29 to cause it to move the shift finger 23 in the X-X direction, into engagement with the shift rail to be selected, as appropriate, and then to energize the electric motor 31 to pivot the shift finger 23 in the Y-Y direction, to effect the gear engagement or disengagement, as appropriate. The electric motors 29 and 31 are energized by means of a pair of electrical cables 33 and 35, respectively.

Figure 4:
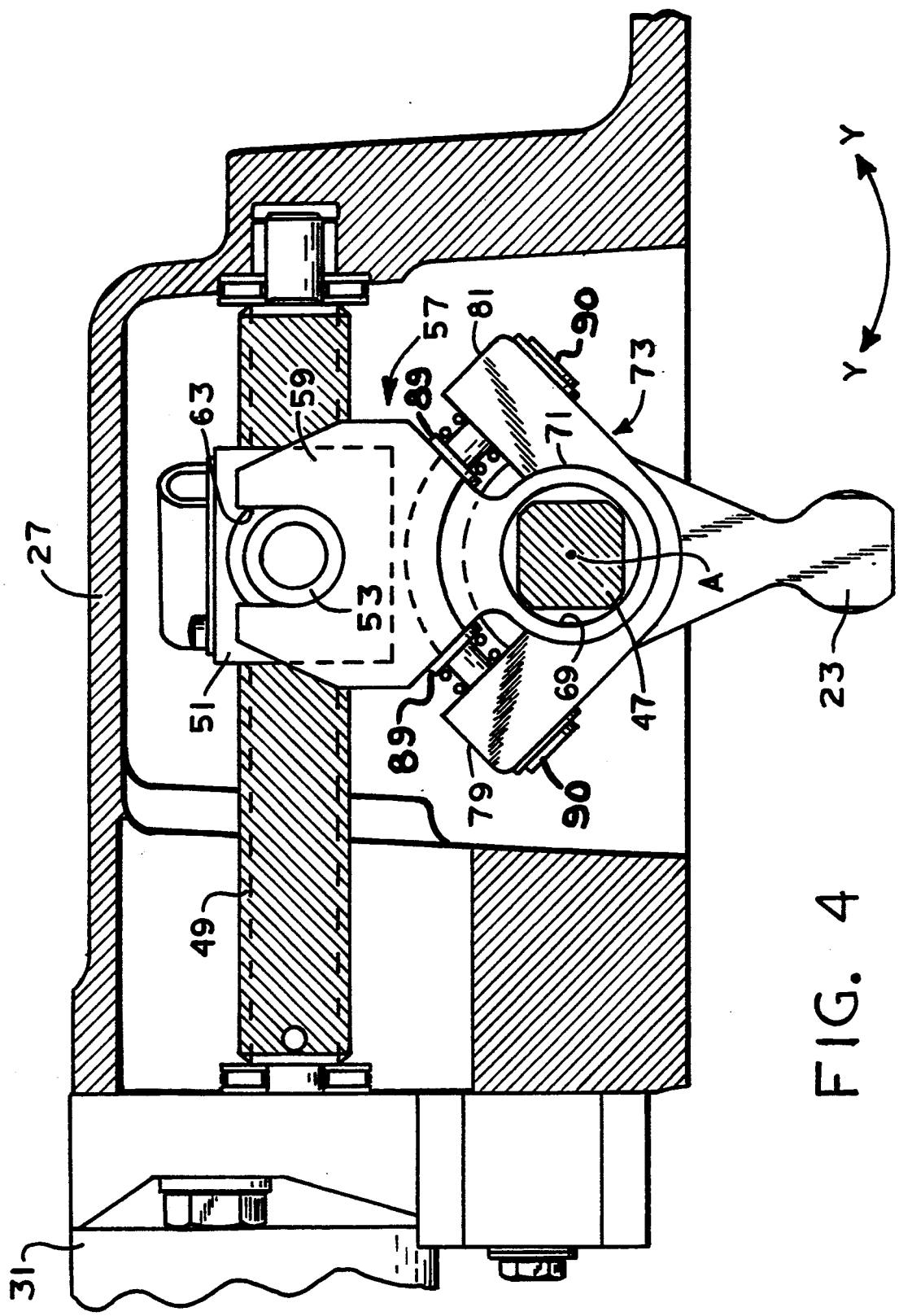
FIG. 4 is a transverse cross-section taken on line 4—4 of FIG. 3 (in the Y-Y direction), and on the same scale as FIG. 3.

Referring now primarily to FIGS. 3 and 4, the shifting mechanism 25 is of the general type illustrated and described in greater detail in above-incorporated U.S. Pat. No. 4,873,881. A first shaft member, generally designated 37, is rotatably mounted within the housing 27 about to its axis of rotation, with the opposite ends of the shaft 37 received within, and rotatably supported by the housing 27. A shift finger carrier member 39 is disposed co-axially on the shaft 37. The carrier member 39 is operable to move in opposite axial (X-X) directions along the shaft 37, as well as being able to rotate about the axis A of the shaft 37, as will be described in connection with FIG. 4. In the subject embodiment, the shift finger 23 is formed integrally with the carrier member 39 for movement therewith in both the axial (X-X) and transverse (Y-Y) directions.

A second shaft member 41 is drivingly connected to the electric motor 29 at its right end in FIG. 3, and at its left end, the shaft 41 is journalled for rotation relative to the housing 27. The second shaft member 41 rotates about an axis of rotation which is, preferably, substantially parallel to the axis of rotation of the first shaft member 37. In the subject embodiment, the axes of rotation of the shaft members 37 and 41 both lie in the plane of FIG. 3.

The second shaft member 41 is externally threaded, and a first threaded traversing member 43 is in threaded engagement with the external threads of the shaft 41, and operable to traverse in opposite axial (X-X) directions along the shaft 41, as the shaft 41 is rotated by the electric motor 29. The shaft member 41 and traversing member 43 together comprise a recirculating ball screw mechanism of the type which is generally well known to those skilled in the art, and will not be described in detail herein. At the right end in FIG. 3 of the shift finger carrier member 39 is an annular portion or shoulder 45 which is received within an arcuate groove on the underside of the traversing member 43, such that traversing movement of the member 43 results in axial movement of the carrier member 39 along the axis of the shaft 37. The first shaft member, generally designated 37, includes a generally central portion 47, disposed to the left (in FIG. 3) of the carrier member 39. As may best be seen in FIG. 4, the central portion 47 of the shaft 37 has a generally square cross-section (but preferably with rounded corners) and extends into the shift finger carrier member 39. The purpose of the central shaft portion 47 being generally square is to enable the carrier member 39 to move in the axial (X-X) direction along the shaft portion 47, while being rotatable with the shaft portion 47 whenever the first shaft member 37 is rotated about its axis, in a manner to be described subsequently.

For purposes of subsequent description, it will be assumed that the electric motor 29 has been energized, rotating the second shaft member 41 in the appropriate direction to cause traverse movement of the traversing member 43. Such movement of the member 43 results in corresponding movement of the shoulder 45 and the shift finger carrier member 39, thus positioning the shift finger 23 in the appropriate axial (X-X) direction, in preparation for shifting whichever of the shift rails 11, 13, or 15, is to be shifted.

Referring now to FIGS. 4 through 6, in conjunction with FIG. 3, the mechanism for moving the shift finger 23 in the transverse (Y-Y) direction will be described. As may best be seen in FIG. 4, a third shaft member 49 is drivingly connected to the electric motor 31, at its left end in FIG. 4, with the right end of the shaft member 49 being journalled within the housing 27. The third shaft member 49 is externally threaded in the same manner as the second shaft member 41, and a second threaded traversing member 51 is in threaded engagement with the third shaft member 49, in the same way as the traversing member 43 is with the shaft member 41. However, because the third shaft member 49 rotates about an axis of rotation which lies in the plane of FIG. 4, perpendicular to the plane of FIG. 3 (see FIG. 2), the traversing member 51 is operable to traverse in opposite transverse (Y-Y) directions along the shaft member 49 in response to the electric motor 31 rotating the shaft member 49.

The second traversing member 51 differs from the first traversing member 43 in that it is provided with first and second trunnion members 53 and 55, disposed on opposite axial sides of the traversing member 51, the function of the trunnion members to be described subsequently.

Referring now primarily to FIGS. 3 through 5, there is a lever member, generally designated 57, which, as may be seen only in FIG. 3, includes a pair of upstanding lever arms 59 and 61. In FIGS. 4 and 5, only the lever arm 59 is visible, with the lever arm 61 being substantially identical, but out of sight and behind the lever arm 59 in both FIGS. 4 and 5. Each lever arm defines a generally U-shaped slot 63, within which is received a portion of the respective trunnion member 53 or 55. Thus, movement of the second traversing member 51 in the transverse (Y-Y) direction is transmitted by the trunnion member 53 and 55 to the lever arms 59 and 61, respectively, causing the entire lever member 57 to pivot about the axis of rotation A (see FIG. 4) of the first shaft member 37 and shaft portion 47.

Referring still primarily to FIGS. 3, 4, and 5, the lever arms 59 and 61 terminate, at the lower portion thereof, in an axially-extending, generally arcuate web portion 65. Extending downward from the web portion 65 is an annular portion 67 ( hidden from view in FIG. 3), which defines an inside diameter 69, and which is sized such that the lever member 57 is free to pivot about the axis of rotation A, relative to the shaft portion 47, without engagement therewith. The annular portion 67 also defines an outside, generally cylindrical surface 71, the function of which will be described subsequently.

Referring now primarily to FIGS. 3, 4, and 6, disposed about the shaft portion 47 is a generally V-shaped spring seat member, generally designated 73. The member 73 defines an internal drive surface 75, which is preferably shaped to mate with the central shaft portion 47, and be closely space thereto, whereby rotation of the spring seat member 73 about the axis of rotation A will result in rotation of the shaft portion 47. The spring seat member 73 defines an internal, generally cylindrical surface 77, which, preferably, has a diameter just slightly larger than that of the outside cylindrical surface 71 of the lever member 57. Thus, the surface 77 and the shaft portion 47 together are effective to "pilot" or "center" the annular portion 67 of the lever member 57, relative to the axis of rotation A.

The V-shaped spring seat member 73 includes transversely opposite (i.e., disposed oppositely about the axis of rotation A), first and second legs 79 and 81, respectively. Referring now primarily to FIG. 6, each leg defines a stepped bore 83, having a shoulder member 85 pressed or threaded into the lower end of the bore. The shoulder member 85 defines an opening through which a rivet-like member 87 extends, the member 87 including a rivet head 89 at its upper end, and a rivethead 90 at its lower end. Disposed between the rivet-like member 87 and the bore 83 is a helical, compression spring 91, having its lower end seated against the shoulder member 85, and its upper end seated against the rivet head 89. Preferably, in the position shown in FIG. 6, each of the springs 91 is partially compressed or preloaded, such that a substantial amount of force is required to move each of the rivet-like members 87 downward, relative to the respective first and second legs 79 and 81.

Referring again to FIGS. 3 and 5, it may be seen that the web portion 65 of the lever member 57 defines, at its opposite arcuate ends, a first seat 93 and a second seat 95 (only the second seat 95 being visible in FIG. 3). In the position shown in FIG. 4, which would typically correspond to a gear-disengaged position, the rivet heads 89, associated with the first and second legs 79 and 81 are biased into engagement with the first and second seats 93 and 95, respectively, with substantially equal biasing force. As a result, with the lever member 57 in the vertical position shown in FIG. 4, the spring seat member 73 is maintained in such a position that the shift finger 23 is also vertical. It should be understood that reference herein, and in the appended claims, to the springs 91 being "seated" or "operably associated" with a particular structure will not be limited so as to require direct contact or engagement with such structure. For example, the springs 91 are not directly seated against the seats 93 and 95, but instead, bias the rivet heads 89 against the seats. As a further example, in the subject embodiment, the opposite ends of the springs 91 are operably associated with the shoulder members 85 which, in turn, are fixed relative to the opposite legs of the spring seat member 73. Being fixed relative to the spring seat member 73 is, in the subject embodiment, functionally equivalent in the rotational direction, to being operably associated with the shift finger assembly (i.e., the combination of the shift finger 23, the carrier member 39, and the shaft member 37, including the square shaft portion 47).

Operation

When the electric motor 31 is energized, rotating the shaft 49, the traversing member 51 moves, and it will be assumed for purposes of subsequent description, that the member 51 moves to the right in FIG. 4. Thus, the lever member 57 is pivoted clockwise in FIG. 4 about the axis of rotation A. The biasing force of the springs 91 is sufficient such that the spring 91 associated with the second leg 81 will not be compressed, but instead, will transmit to the spring seat member 73 sufficient force to cause it to pivot about the axis of rotation A and rotate the shaft portion 47 (and the entire shaft 37) clockwise in FIG. 4. Such rotation of the shaft 37 will result in clockwise pivotal movement of the shift finger 23 about the axis of rotation A.

As the shift finger 23 moves clockwise about the axis of rotation A, the selected shift rail (11, 13, or 15) is moved transversely to the left in FIG. 2. If the particular jaw clutch being engaged is in a non-synchronous condition, and engagement does not occur, the clutch member being moved by the particular shift fork (17, 19, or 21) will typically be subjected to kick-out, as was described in the BACKGROUND OF THE DISCLOSURE. When such kick-out occurs, the selected shift rail is moved to the right in FIG. 2, back toward the neutral, centered, position shown in FIG. 2. This results in movement of the shift finger 23 in a counter-clockwise direction about the axis of rotation A. In connection with this explanation, it should be understood that the kick-out phenomenon is a continuous one, i.e., kick-out will occur, then the shift mechanism will try to re-engage the jaw clutch, and kick-out will occur again, etc. As was also mentioned in the BACKGROUND OF THE DISCLOSURE, such kick-out movement has, prior to the present invention, been able to transmit sufficient force through the shift mechanism, such that damage to the shift mechanism would frequently occur.

With the present invention, the counter-clockwise movement of the shift finger 23, as a result of the kick-out movement, will cause compression of the spring 91 associated with the second leg 81. This compression of the spring 91 dissipates much of the energy being transmitted back through the shift mechanism, thus protecting the various components of the mechanism, and especially the ball screw traversing member 51.

Typically, after such a kick-out has occurred, because of a non-synchronous condition, the two relatively rotating clutch members will eventually (within several seconds) reach the required synchronous condition. With the present invention, after the synchronous condition has been achieved, the lever member 51 is still in the position corresponding to the desired shift (i.e., rotated clockwise from the position shown in FIG. 4). Because the spring 91 associated with the second leg 81 is compressed, as soon as the synchronous condition occurs, the "preload" on the spring 91 will again cause the seat member 73 to pivot clockwise about the axis of rotation A, in the same manner as occurred during the initial movement of the shift rail. Thus, the present invention not only protects the shifting mechanism during the kick-out phenomenon, but then, subsequently, preloads the shift rail and is effective to re-engage the selected shift rail as soon as the synchronous condition occurs.

During the course of the development of the present invention, it has been determined that an additional benefit results from the use of the invention. Whenever a particular shift rail has been selected, and the associated jaw clutch is engaged, to select the desired gear, the jaw clutches are typically held in engagement as a result of what is known as "torque lock". In this condition, what is usually required to allow disengagement of the jaw clutches is either a torque interruption or a torque reversal. Therefore, selecting neutral, and attempting to return the selected shift rail to the neutral position shown in FIG. 2, exerts a substantial amount of force on the various components of the shift mechanism, and can result in excessive wear of the components.

The device of the invention permits the "preselection" of neutral whereby, for example, the shaft 49 is rotated until the traversing member 51 is again in the position shown in FIG. 4. However, because of the torque lock of the jaw clutches, the shift finger 23 is still in its shifted position, pivoted somewhat clockwise from the position shown in FIG. 4. In the condition described, the spring 91 associated with the first leg 79 is compressed, and the mechanism remains in that position until a "torque break" occurs. As is well known to those skilled in the art, a torque break (i.e., torque momentarily equal to 0) would typically occur during a torque reversal. During a torque break, the jaw clutches are no longer torque locked, and the preload of the spring 91 associated with the first leg 79 is sufficient to return the shift finger 23 to the position shown in FIG. 4 (returning the shift rail to the position shown in FIG. 2) and popping the axially movable clutch out of engagement with its mating clutch. Thus, it may be seen that the structure of the present invention will enable the mechanism to "preselect" neutral, and a return to neutral will automatically occur at just the right time (i,e., at a torque break), without the need for any sort of sensors, speed controls, or other complicated circuitry or controls.

Although the invention has been described in connection with helical, compression springs 91, those skilled in the art will recognize that various other forms of springs may be used, and that any spring which is capable of exerting a linear or torsional biasing force is within the scope of the invention. It is also preferable that the particular spring being utilized be capable of storing energy, and then subsequently translating that energy into pivotal or rotational movement of the shift finger assembly relative to the lever member.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A shifting mechanism for controlling the shifting of change-gears of a mechanical change-gear transmission of the type having at least one shift rail movable in a first (Y-Y) transverse direction from a gear-disengaged position to a gear-engaged position; said shifting mechanism comprising a housing and shaft means disposed within said housing and supported therein, said shaft means defining an axis of rotation; a shift finger assembly including a shift finger and being operatively associated with said shaft means and pivotable about said axis of rotation to move said finger in said first (Y-Y) transverse direction; input means including a lever member pivotable about said axis of rotation to cause said pivotal movement of said shaft means and said shift finger; characterized by:

(a) one of said shift finger assembly and said lever member defining a spring seat;

(b) spring means including a first end seated against said spring seat, and a second end operably associated with the other of said shift finger assembly and said lever member, whereby pivotal movement of said lever member in a first (clockwise) rotational direction about said axis of rotation is transmitted through said spring means to resiliently bias said shift finger assembly toward an engaged position, moving said shift finger in said first (Y-Y) transverse direction.

2. A shifting mechanism as claimed in claim 1, characterized by said transverse movement of said shift rail in said first (Y-Y) transverse direction is adapted to cause at least partial engagement of a jaw clutch, whereby kick-out movement of said jaw clutch results in pivotal movement of said shift finger in a second (Y-Y) transverse direction, said movement tending to compress said spring means.

3. A shifting mechanism as claimed in claim 1, characterized by said shift finger being disposed for axial movement in a first (X-X) axial direction, whereby said shift finger is axially movable for engagement any one of said shift rails.

4. A shifting mechanism as claimed in claim 1, characterized by said spring means comprises a seat member fixed for rotation with said shift finger assembly.

5. A shifting mechanism as claimed in claim 4, characterized by said seat member comprising first and second seat portions, disposed generally oppositely and symmetrically about said axis of rotation.

6. A shifting mechanism as claimed in claim 5, characterized by each of said first and second seat portions, including a spring means, said lever member defining first and second spring seats, disposed to be in engagement with said spring means of said first and second seat portions, respectively.

7. An X-Y shifting mechanism for controlling the shifting of change-gears of a mechanical change-gear transmission of the type having at least one shift rail movable in a first (Y-Y) transverse direction from a gear-disengaged position to a gear-engaged position; said shifting mechanism comprising a housing and shaft means disposed within said housing and supported therein for axial movement in a first (X-X) axial direction, said shaft means defining an axis of rotation; a shift finger assembly including a shift finger and being operatively associated with said shaft means and pivotable about said axis of rotation to move said finger in said first (Y-Y) transverse direction; input means including a lever member pivotable about said axis of rotation to cause said pivotal movement of said shaft means and said shift finger; characterized by:

(a) one of said shift finger assembly and said lever member defining a spring seat;

(b) spring means including a first end seated against said spring seat, and a second end operably associated with the other of said shift finger assembly and said lever member, whereby pivotal movement of said lever member in a first (clockwise) rotational direction about said axis of rotation is transmitted through said spring means to cause said pivotal movement of said shift finger assembly to move said shift finger in said first (Y-Y) transverse direction.

8. An X-Y shifting mechanism as claimed in claim 7, characterized by said transverse movement of said shift rail in said first (Y-Y) transverse direction is adapted to cause at least partial engagement of a jaw clutch, whereby kick-out movement of said jaw clutch results in pivotal movement of said shift finger in a second (Y-Y) transverse direction, said movement tending to compress said spring means.

* * * * *